July 20, 1943.  E. POWELL  2,324,535
VACCINE INJECTOR
Filed Jan. 29, 1942
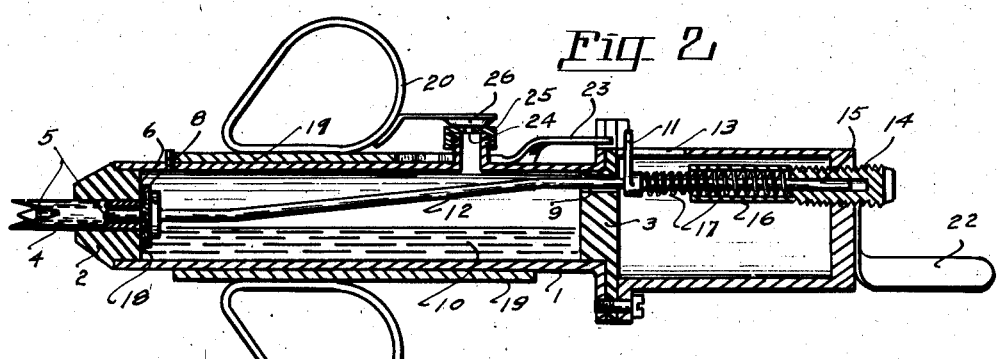
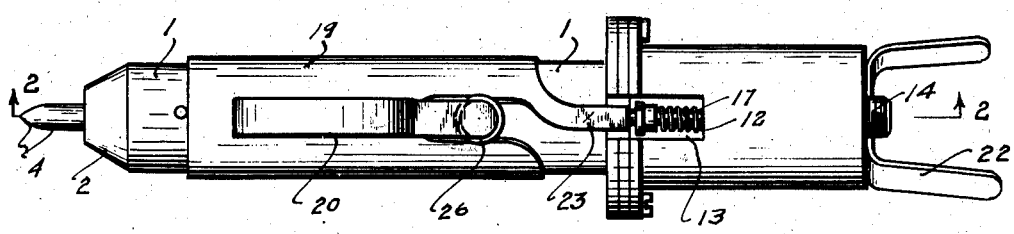
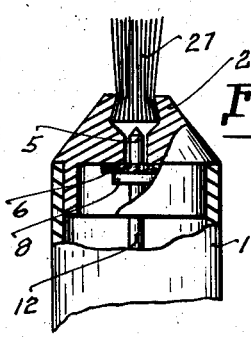
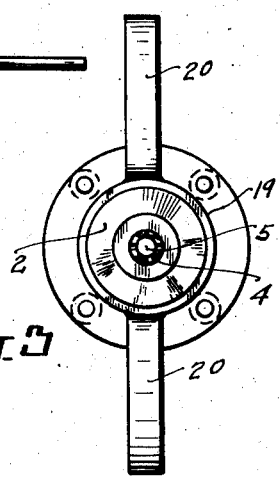
Inventor
Edward Powell
By *[signature]*
Attorney Patented July 20, 1943

2,324,535

UNITED STATES PATENT OFFICE 2,324,535

VACCINE INJECTOR

Edward Powell, Portland, Oreg.

Application January 29, 1942, Serial No. 428,660

7 Claims. (Cl. 128—215)

The vaccination of poultry is carried out by what is termed "the stick method" and the "brush method". The stick method places the vaccination material or vaccine within the skin of the bird to a depth of from 1/8 to 1/4 inch. If vaccinated through the wing webb, the material is placed completely through and naturally forms two spots on the skin where vaccination injuries can be observed.

The instrument used to vaccinate fowls by the "stick method," is some sort of sharp sticking, scarifying, puncturing, or incising arrangement. Instruments most used are darning needles and other kind of needle arrangement fixed or unfixed in an improvised handle, knives or scalpels, and various other types of sharp tools or sharp instruments.

In use, the sharp instrument is dipped into the vaccine fluid and the bird is stuck either in the thigh or webb of the wing. Thus, the virus in the vaccinating material is carried into the skin and the particular area becomes active with the disease induced and within a certain period of time builds up an immunity within the fowl's body, which renders it resistant to that particular disease for a certain time.

Perhaps the outstanding disadvantage of the "stick method" is the time and motion required to carry out the vaccinating procedure. For example, one must carefully arrange the vial containing the vaccine, must carefully dip the instrument into the liquid and laboriously carry out the motion of redipping for each bird vaccinated.

Waste of vaccine material would be considered as next to importance. To assure the vaccinator instrument having enough potent liquid to carry a sure charge, the operator usually uses too much. This not only wastes the vaccine, but may overdose the bird and cause too harsh a vaccination reaction.

Danger of careless handling and spilling and spread of the virus is common under the present system. All authorities caution against the spilling of vaccine in cases where the farmer deals with the live virus, such as is the case when handling chicken pox vaccine.

The brush method of vaccination, because of the direct bearing it has upon the idea herein described, a popular type of present day vaccination should be mentioned. It is the so called brush-type.

Instead of a sharp instrument, a stiff bristle brush, similar to a glue brush is used. This is dipped into the vaccine and the vaccination is carried out by pulling a few feathers from the bird's body and brushing the virus into the open bleeding holes left where the wing feathers were formerly attached. This induces the disease into this area and immunity is promoted.

Another vaccination procedure is to dip the brush into the vaccination fluid and briskly brush a portion of the bird's mucous membrane, for example, the inner part of the anus, or what is scientifically termed the fowl's cloaca or vent. This induces the disease in the particular posterior portion of the bird's anatomy and renders an immunity, which for example, prevents the fowl's head parts, or breathing apparatus from becoming involved which latter cases may result in the bird's death and great economic loss to the farmer.

Present practices of the use of the brush present the same disadvantages as those listed above for the stick method, viz., laborious waste vaccine, careless and dangerous handling of live virus vaccine, exposure of vaccine to air, dust, sunlight and heat, and technical aspects of mixing the vaccine for use with the brush. Most certainly the spread of the diseases, as outlined above, may occur just as readily with the brush bristles, as with the stick instrument above described, and on the face of it, it would appear that the brush would present a multiple arrangement of stickers which would increase the carrying ability from one bird to another.

Vaccine is only at its best when kept as unexposed as possible from excess air, dust, sunlight and heat. The present system of the stick method, or the brush method, is usually performed with all four in excess and many cases are on record where one or all of these agencies have rendered the vaccine impotent or ineffective.

The technical aspects of the present vaccine preparation are somewhat disadvantageous. The farmer receives a measured quantity of liquid material and in addition, a measured quantity of dry powder like substance. These he must mix just before vaccinating, and if not mixed according to expert instructions, birds may be overdosed or under dosed, in the former case becoming violently ill, or in the latter case, not acquiring the necessary immunity to protect them against the specific disease.

Spread of disease through the agency of the instrument. While this is a major trouble encountered in the present procedure used, it is not one generally recognized throughout the poultry world. There are many ideas advanced by recognized authorities regarding the possibilities of organisms from the body of one bird being transferred to the body of another, through the medium of some such sharp vaccinator which is used as a common wounding instrument for thousands upon thousands of birds one after the other. The sum and substance of popular authoritative thinking, however, is coming more to regard this as something to be dealt with in the control of some of the most dreaded and persistent poultry diseases.

The Powell vaccinator is an instrument originated, designed, built and used to overcome the disadvantages and improve upon the vaccination of animals, particularly fowls, turkeys, chickens, etc. Wherever it has been carried on, with its major object or purpose to place within the skin, on it, under it, or in or on the membranes or, in fact, any of the tissue cells, or part of the body of any animal or bird, any vaccinating substance, whatsoever.

The present instrument is a cylinder or metal with a movable plunger so arranged that when the thumb pushes a plunger, an exposed needle is drawn into the barrel where it becomes wet with the liquid, which is contained therein. Upon releasing the thumb pressure and slowing the plunger to come to rest, the needle becomes an integral part of a sticking assembly, which consists of the penetrating points and a third inner point, the aforementioned needle—which comprises the sticking assembly when thrust into the body of the bird or animal, carries with it the substance picked up by the sliding needle as it reached its position up inside of the barrel containing the reservoir of liquid, or other substance, designed to be put into the animal or bird cell, tissue, or other part of the body.

It is readily seen that my vaccinator overcomes certain present day disadvantages, viz. It speeds up vaccinating procedure; it prevents waste, due to careless handling during vaccinating operations; it helps protect the vaccine from air, dust, sunlight and heat; it helps to hold down to a minimum, the chances of spreading the live virus vaccination materials around the farm to unvaccinated birds, etc., it furnishes a measured dosage of vaccine to the bird or animal, which in the case of certain vaccines containing live virus, helps to assure the success of the vaccination and prevent non-takes, as well as mortality and illness, due to overdosage.

In the drawings:

Figure 1 is a side view of the assembled instrument, particularly illustrating the invention.

Figure 2 is a sectional view of Figure 1 on line 2—2, Figure 1.

Figure 3 is an end view taken at the injecting end of the instrument.

Figure 4 is a detailed view of the feed control plunger.

Figure 5 is a broken view, partly in section, of a modification, illustrating a brush applicator principle.

The improved vaccine applicator instrument comprises a cylindrical body 1, forming a vaccine reservoir and having a liquid tight applicator nozzle 2 at one end, and closed by a liquid tight wall 3 at its opposite end. Arranged in the nozzle end 2 is a sharp penetrating point-formed member 4 for preparing the flesh of the fowl for receiving the vaccine in the following manner.

A plunger 5 is loosely fitted within the hollow point 4 and the space surrounding the same within the member 4 is sealed liquid tight against the reservoir 1 by a sealing gasket 6, which is secured to the plunger 5 by the collar 8. The plunger 5 extends rearwardly of the instrument passing through the wall 3 at 9 with a working fit that will be tight enough to prevent passage of the vaccine 10 from the reservoir 1. An arm 11 is secured to the plunger stem 12, preferably at a right angle thereto and extends beyond the outer wall of the instrument through a slot 13. The plunger 12 extends beyond the arm 11 into the adjustable guide 14 at 15. The guide 14 is formed at 16 to receive a spring 17, which functions when operating to force the stem 12 towards the nozzle end of the instrument, seating the gasket 6 against the shoulder 18 of the nozzle 2, and preventing the vaccine from escaping from the reservoir through the hollow point 4 and past the plunger 5.

In order to permit the vaccine to flow out through the point 4, the arm 11 must be forced against the spring 17, withdrawing the stem 12 and moving the gasket 6 from the shoulder 18, allowing the vaccine to flow past the plunger 5. The arm 11 is operated in the following manner.

Surrounding the body of the instrument is a reciprocating tube 19. This tube is operated by the forefinger and second finger of the operator's hand by passing the operator's fingers through the loops 20 and resting the thumb on the forked ends 22. The cylinder 19 when moved towards the arm 11 compresses the spring 17 by the rearwardly extending bar 23 carried by the tube 19, contacting the arm 11, operating the plunger 12, and permitting flow of the vaccine, as described.

The amount of vaccine that will be released can be governed by the position of the adjusting guide 14, which controls the longitudinal travel of the plunger 12. In order to free flow of the vaccine from within the cylinder 1 when the gasket 6 is withdrawn, a breather hole 24 is provided within a vaccine filler cap 25. This hole is normally closed by a pad 26, but as the tube 19 is moved towards the rear of the instrument to operate the stem 12, the pad 26 will uncover the hole 24 allowing air to enter the vaccine chamber.

In operation, the instrument is held in the hand as described; the point 4 is applied under pressure to a convenient place on the fowl, penetrating the flesh. The tube 19 is moved longitudinally of the device by the fingers of the hand through the loops 20 forcing the arm 11 and plunger 12 to the rear of the instrument, retracting the gasket 6 from the shoulder 18 of the nozzle and allowing vaccine to flow along the plunger 5 out the nozzle point 4 to the flesh of the fowl. On the releasing of the loops 20, the spring 17 will return the tube 19 to the position shown, returning the gasket 6 to its sealing position to cut off the supply of the vaccine to the applicator point 4.

Another preferred form of applicator is shown in Figure 5, wherein the brush principle is used. The mechanism in this instrument is the same, except that bristles 27 are located in the nozzle 2 in place of the point 4. A number of feathers are removed from the fowl and the vaccine released through the bristles 27 is applied to the bleeding flesh of the fowl by the brush.

It is believed that an instrument with individual points to be used on the fowls will prevent the spread of disease.

What is claimed as new is:

1. A vaccine applicator, including a vaccine reservoir, a perforating point at one end of the reservoir, a plunger operative in such point, a sealing element on the plunger to close the point against the reservoir when the plunger is in operative position, means for automatically moving the plunger to operative position, and means for manually withdrawing the plunger to inoperative position relative to the point, said manual means withdrawing the sealing element to permit free communication between the point and reservoir.

2. A vaccine applicator, including a vaccine reservoir, a hollow penetrating point at one end of the reservoir, a plunger movable in the point to deliver vaccine thereto, an extension of the plunger leading through the reservoir, a seal on the extension to close the point against the reservoir when the plunger is in operative position, a manually-operable sleeve slidable on the reservoir, a connection on the sleeve to engage and operate said extension to move the plunger and seal to inoperative positions, and means cooperating with the extension to automatically move the plunger and seal to operative position on release of sleeve control.

3. A construction as defined in claim 2, wherein the means for automatically operating the plunger and seal includes a spring cooperating with the plunger extension and tensioned to operate such extension when the sleeve is operated to move the plunger and seal to inoperative position.

4. A construction as defined in claim 2, wherein the means for automatically operating the plunger and seal includes a spring cooperating with the plunger extension and tensioned to operate such extension when the sleeve is operated to move the plunger and seal to inoperative position, together with adjustable means to limit movement of the seal and plunger under sleeve operation.

5. A construction as defined in claim 2, wherein the reservoir is formed with an air vent, and means controlled in sleeve movement for opening and closing said vent.

6. A construction as defined in claim 2, wherein the plunger extension is formed with a lateral arm and wherein the sleeve is provided with a projection to engage said arm to move the plunger extension, said plunger extension beyond the arm cooperating with an extension operating spring tensioned in the sleeve-compelled arm movement of said extension.

7. A construction as defined in claim 1, wherein the penetrating point includes a tubular element removably engaging the reservoir end, with said tubular element formed with penetrating points at the end remote from the reservoir.

EDWARD POWELL.